United States Patent
McNutt

(10) Patent No.: US 8,224,792 B2
(45) Date of Patent: Jul. 17, 2012

(54) GENERATION OF REALISTIC FILE CONTENT CHANGES FOR DEDUPLICATION TESTING

(75) Inventor: Bruce McNutt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 12/549,999

(22) Filed: Aug. 28, 2009

(65) Prior Publication Data
US 2011/0055171 A1   Mar. 3, 2011

(51) Int. Cl.
*G06F 17/00* (2006.01)
*G06F 7/00* (2006.01)
(52) U.S. Cl. ........................................ 707/692; 711/216
(58) Field of Classification Search .................. 707/692, 707/758, 999.202, 999.006; 709/203; 714/6.1
See application file for complete search history.

(56) References Cited

U.S. PATENT DOCUMENTS

| | | | |
|---|---|---|---|
| 6,775,791 B2* | 8/2004 | McAfee ......................... 714/6.1 |
| 6,845,479 B2 | 1/2005 | Illman | |
| 7,092,956 B2 | 8/2006 | Ruediger | |
| 7,103,608 B1 | 9/2006 | Ozbutun et al. | |
| 7,130,867 B2 | 10/2006 | Luke | |
| 7,519,635 B1* | 4/2009 | Haustein et al. ....... 707/999.202 |
| 7,814,149 B1* | 10/2010 | Stringham .................... 709/203 |
| 2002/0133776 A1 | 9/2002 | Illman | |
| 2007/0255758 A1 | 11/2007 | Zheng et al. | |
| 2008/0005201 A1 | 1/2008 | Ting et al. | |
| 2008/0104146 A1 | 5/2008 | Schwab et al. | |
| 2008/0162580 A1 | 7/2008 | Ben Harush | |
| 2008/0294696 A1 | 11/2008 | Frandzel | |
| 2009/0076911 A1* | 3/2009 | Vo et al. ......................... 705/14 |
| 2009/0083344 A1 | 3/2009 | Inoue et al. | |
| 2009/0271402 A1* | 10/2009 | Srinivasan et al. ..... 707/999.006 |
| 2010/0205158 A1* | 8/2010 | Dybas ........................... 707/692 |

* cited by examiner

*Primary Examiner* — Sathyanarayan Pannala
(74) *Attorney, Agent, or Firm* — Griffiths & Seaton PLLC

(57) ABSTRACT

Method, system, and computer program product embodiments for facilitating deduplication product testing in a computing environment are provided. In one such embodiment, data to be processed through the deduplication product testing is arranged into a single, continuous stream. At least one of a plurality of random modifications are applied to the arranged data in a self-similar pattern exhibiting scale invariance. A plurality of randomly sized subsets of the arranged data modified with the self-similar pattern is mapped into each of a plurality of randomly sized deduplication test files.

17 Claims, 4 Drawing Sheets

GENERATION OF REALISTIC FILE CONTENT CHANGES FOR DEDUPLICATION TESTING

BACKGROUND OF THE INVENTION

1. Field of the Invention

The present invention relates in general to computers, and more particularly to apparatus, method and computer program product embodiments for generating realistic file content changes for deduplication testing in a computing storage environment.

2. Description of the Related Art

Computers and computer systems are found in a variety of settings in today's society. Computing environments and networks may be found at home, at work, at school, in government, and in other settings. Computing environments increasingly store data in one or more storage environments apart from the local interface presented to a user. In many cases, the storage environments are located across wide area networks (WANs), in which data is sent to/received from a storage system located remotely from the host.

In some situations, data storage is provided locally and also provided to a remote storage environment to enhance data security by providing redundancy. In these situations, several instances of data may be stored in multiple locations. While this scenario provides for failsafe recovery in the event of data loss at one location, the maintenance of a number of redundant copies expends resources, such as consuming network bandwidth.

To combat this issue, data deduplication mechanisms are being implemented in greater frequency. Data deduplication refers to the elimination of redundant data. In the deduplication process, duplicate data is deleted, leaving only one copy of the data to be stored. However, indexing of all data is still retained should that data ever be required. Deduplication mechanisms reduce the required storage capacity since only the unique data is stored.

SUMMARY OF THE INVENTION

Computer components, software and hardware, require testing to validate and/or verify performance. Accordingly, deduplication mechanisms are tested to determine if a file processed through these deduplication mechanisms exhibits various deduplication factors, such as particular deduplication ratios. This is required in order to demonstrate an improvement in performance and storage requirements stemming from incorporating deduplication technology into existing storage mechanisms, such as backup processing.

One current validation mechanism utilizes test tools that modify a specified percentage of a set of file content. The drawback of this mechanism, however, is that the performance and effectiveness of deduplication depends upon the minimum size of deduplicated fields within the data that can be recognized. To ensure that testing will reflect likely results for a specific choice of deduplication algorithm and minimum field size, the distribution of modified and unmodified field sizes must be controlled. Requirements for certain sizes and content of test files may negatively impact the accuracy of subsequent deduplication testing.

In view of the foregoing, a need exists for a mechanism to facilitate deduplication testing over a wide variety of realistic file content changes, including size and content of files. Accordingly, various method, system, and computer program product embodiments for facilitating deduplication product testing in a computing environment by generating realistic file content changes are provided. In one embodiment, by way of example only, a method for facilitating deduplication product testing in a computing environment by a processor in communication with a memory device is provided. Data to be processed through the deduplication product testing is arranged into a single, continuous stream. At least one of a plurality of random modifications is applied to the arranged data in a self-similar pattern exhibiting scale invariance. A plurality of randomly sized subsets of the arranged data modified with the self-similar pattern is mapped into each of a plurality of randomly sized deduplication test files.

In addition to the foregoing exemplary embodiment, various other system, computer program product, and method of manufacture embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for facilitating deduplication product testing in a computing environment. These mechanisms facilitate such deduplication product testing through generation of a variety of deduplication test files exhibiting realistic file content changes. When these deduplication test files are processed through testing of a particular deduplication product, characteristics are observed that may be extrapolated to an impact that may occur if the deduplication product (including a particular deduplication algorithm) is applied to production data. As a result, the illustrated embodiments enable objective deduplication product testing using a variety of files having varying sizes and file content, much like what would occur in deduplication of production data.

Figure 1:
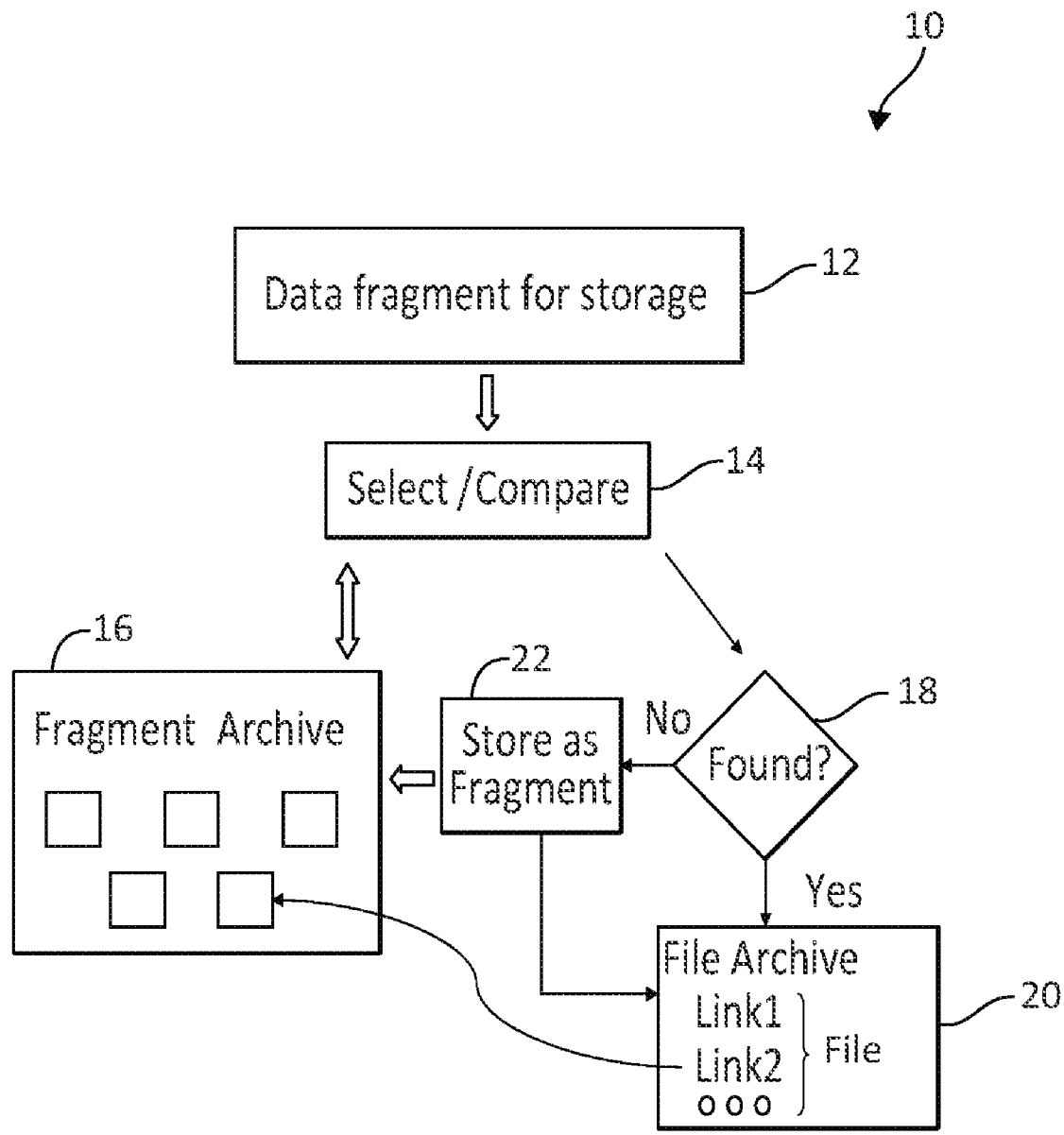
FIG. 1 is a block diagram illustrating an exemplary data deduplication process.

Turning to FIG. 1, a block diagram of an exemplary deduplication process 10 is illustrated. A data fragment for storage 12 is presented to a deduplication mechanism for analysis. In one embodiment, the boundaries for the data fragment are computed dynamically by a deduplication algorithm. This deduplication algorithm attempts to find new duplicate sections in arriving material by comparing against its existing fragment archive 16 of data fragments in a select/compare analysis 14. Material that cannot be matched with an existing file in file archive 20 is added to the fragment archive 16 (see decision 18, and store as fragment block 22). New files are stored by replacing as many sections as possible with links into the fragment archive 16.

For conceptual purposes, FIG. 1 distinguishes between the archive of data fragments 16 and the archive used to retrieve files (i.e., file archive 20). Although this helps to illustrate the use of links to reduce file size, such a clear-cut distinction may not occur in practice. A practical implementation would typically keep track of both types of information in a common storage area. Also, a specific file might well be represented with a mix of both data fragments as well as links.

Select/compare block 14 may be implemented using one of two processes. One process involves both the identification of a potential match, followed by verification. To verify a match, the entire contents of an arriving fragment are compared with the archive. An alternative process is to omit verification, through the use of digital fingerprinting techniques that are considered sufficiently reliable to guarantee the correctness of the match.

Figure 2:
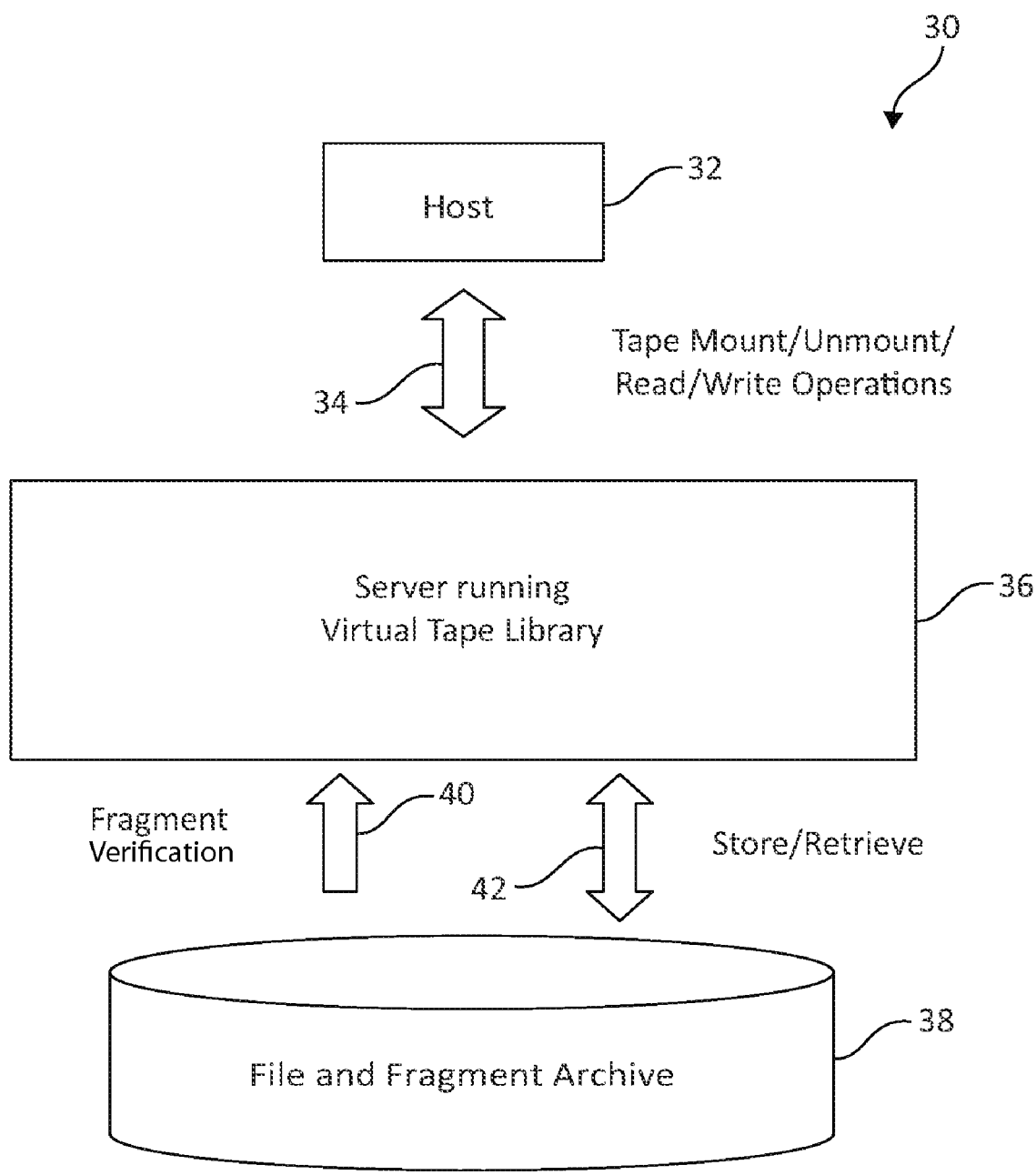
FIG. 2 is a block diagram illustrating an exemplary deduplication product.

Turning now to FIG. 2, an exemplary deduplication product 30 is illustrated. A host 32 is connected between a server having a virtual tape library 36 and a file and fragment archive repository 38. Host 32 may be a dedicated backup server running backup/restore software such as IBM® Tivoli® Storage Manager (TSM) or a similar product that can perform backup services for a variety of clients within the overall computing environment. These services may include the capability to perform either full or incremental backups, and to recover either an individual file or all backed up files associated with a file system or storage volume.

Figure 3:
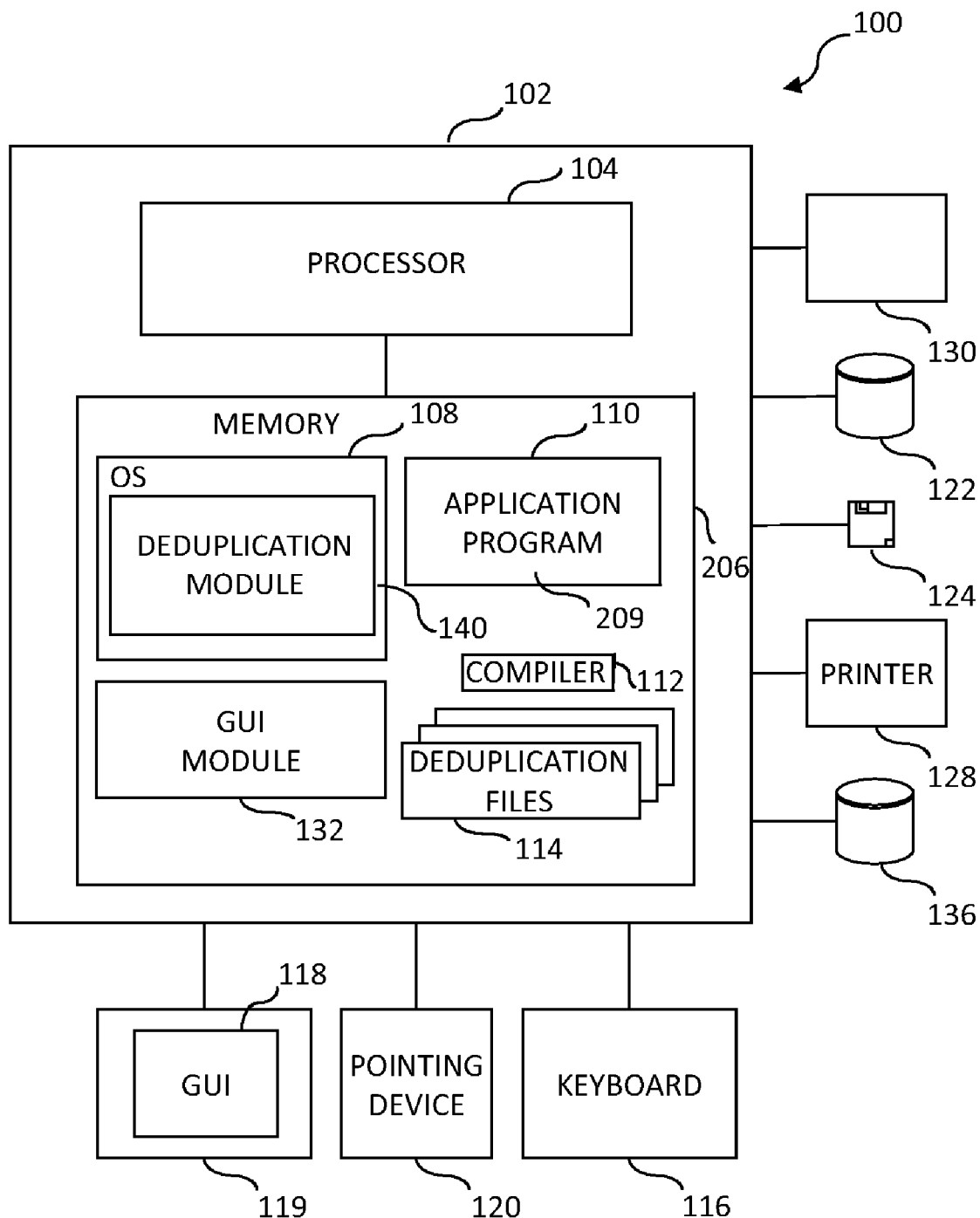
FIG. 3 is a block diagram illustrating an exemplary computing environment in which aspects of the present invention may be implemented.

As shown, the host 32 sends commands to the server 36 to perform tape mount/unmount as well as read/write operations (represented by arrow 34). In turn, the server 36 stores/retrieves data files and fragments from the repository 38 (represented by arrow 42) and performs fragment verification (arrow 40) as previously described FIG. 3 illustrates an exemplary computing environment 100 that can be used to implement embodiments of the present invention. The computer (such as a server) 102 comprises a processor 104 and a memory 106, such as random access memory (RAM). The computer 102 is operatively coupled to a display 119, which presents images such as windows to the user on a graphical user interface 118. The computer 102 may be coupled to other devices, such as a keyboard 116, a mouse device 120, a printer 128, etc. Of course, those skilled in the art will recognize that any combination of the above components, or any number of different components, peripherals, and other devices, may be used with the computer 102.

Generally, the computer 102 operates under control of an operating system (OS) 108 (e.g. z/OS, OS/2, LINUX, UNIX, WINDOWS, MAC OS) stored in the memory 106, and interfaces with the user to accept inputs and commands and to present results, for example through a graphical user interface (GUI) module 132. In one embodiment of the present invention, the OS 108 facilitates deduplication and backup operations. Although the GUI module 132 is depicted as a separate module, the instructions performing the GUI functions can be resident or distributed in the operating system 108, the computer program 110, or implemented with special purpose memory and processors.

OS 108 includes a deduplication module 140 providing a utility for creating and/or testing one or more deduplication test files. The computer 102 also implements a compiler 112 that allows an application program 110 written in a programming language such as COBOL, PL/1, C, C++, JAVA, ADA, BASIC, VISUAL BASIC or any other programming language to be translated into code that is readable by the processor 104. After completion, the computer program 110 accesses and manipulates data stored in the memory 106 of the computer 102 using the relationships and logic that was generated using the compiler 112.

A deduplication fileset 114 of several deduplication test files as previously described is stored on memory 106. The computer 102 also optionally comprises an external data communication device 130 such as a modem, satellite link, Ethernet card, wireless link or other device for communicating with other computers, e.g. via the Internet or other network.

Data storage device 122 is a direct access storage device (DASD) 122, including one or more primary volumes holding a number of datasets. DASD 122 may include a number of storage media, such as hard disk drives (HDDs), tapes, and the like. Data storage device 136 may also include a number of storage media in similar fashion to device 122. The device 136 may be designated as a backup device 136 for holding backup versions of the number of datasets primarily stored on the device 122. As the skilled artisan will appreciate, devices 122 and 136 need not be located on the same machine. Devices 122 may be located in geographically different regions, and connected by a network link such as Ethernet. Devices 122 and 136 may include one or more volumes, with a corresponding volume table of contents (VTOC) for each volume.

In one embodiment, instructions implementing the operating system 108, the computer program 110, and the compiler 112, as well as the definition file(s) 142 and deduplication fileset 114 are tangibly embodied in a computer-readable medium, e.g., data storage device 120, which may include one or more fixed or removable data storage devices, such as a zip drive, disk 124, hard drive, DVD/CD-ROM, digital tape, solid state drive (SSD), etc., which are generically represented as the disk 124. Further, the operating system 108 and the computer program 110 comprise instructions which, when read and executed by the computer 102, cause the computer 102 to perform the steps necessary to implement and/or use the present invention. Computer program 110 and/or operating system 108 instructions may also be tangibly embodied in the memory 106 and/or transmitted through or accessed by the data communication device 130. As such, the terms "article of manufacture," "program storage device" and "computer program product" as may be used herein are intended to encompass a computer program accessible and/or operable from any computer readable device or media.

Embodiments of the present invention may include one or more associated software application programs 110 that include, for example, functions for managing a distributed computer system comprising a network of computing devices, such as a storage area network (SAN). Accordingly, processor 104 may comprise a storage management processor (SMP). The program 110 may operate within a single computer 102 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.) As one skilled in the art will appreciate, however, various additional components of the environment 100 may work individually or in concert to define, initialize, and perform the functionality for facilitating deduplication product testing as will be further described.

To achieve a realistic response in testing deduplication technology using a variety of generated deduplication test files, a separation of the construction of content from definitional data of the files that will contain such content is made. The content may first be constructed in the form of a single, continuous stream of data. Construction of data in this form allows for subsequent data organization and modification by beginning in a generic form, and facilitates calibration of the data by a wider variety of processes.

Following arrangement of the data in a single, continuous stream, the content may be mapped into a number of deduplication test files in a random order. When it is desired to construct changes to the content, the changes are applied to the continuous stream of data, before it is placed into files. Files remain unchanged, change completely, or contain a mix of changed and unchanged regions, depending upon the section of the continuous stream that is mapped to a given file.

To accomplish this separation between files and their content, it is beneficial that the random pattern of modifications applied to the data stream be "self-similar." An exemplary technique for generating a self-similar pattern of data modifications is described below. Once the self-similar modifications are made to the data stream, the modifications exhibit characteristics of scale invariance. The scale invariance of the self-similar pattern results in a situation where both small and large subsets of the stream can placed at random into small and large files, while leaving invariant the original distributional features.

By separating the construction of the data from its placement into files, the mechanisms of the present invention simplify both the generation of realistic patterns of data modification, as well as the calibration of such patterns against actual systems. For example, calibration may be performed against a simple trace of physical I/O references, rather than also requiring the associated layout of the file system. Performance of an I/O trace to obtain such data is known to the skilled artisan.

To generate a self-similar pattern of data modifications within a stream of data, a probability distribution such as a Pareto distribution may be utilized. According to the Pareto distribution, a random variable X obeying this distribution has a cumulative distribution function of the following form:

$$P(X>x)=(x/x\_min)^{-alpha} \quad (1),$$

where x_min is the minimum value and alpha is a positive real number that selects the desired distributional "shape." Testing shows that reasonable values of the parameters may be, in one embodiment, x_min of approximately equal to 4 K, alpha of approximately equal to 1.02.

To begin, the data may be divided into blocks of some size (e.g. 4 K). The blocks may be numbered as 0, 1, 2, 3, . . . , N from left to right. Blocks may then be selected for modification as shown by the following pseudo code:

N=−1
While (N<desired stream length):
  select random Pareto variable X
  N=floor (N+X)
  modify block N.

Figure 4:
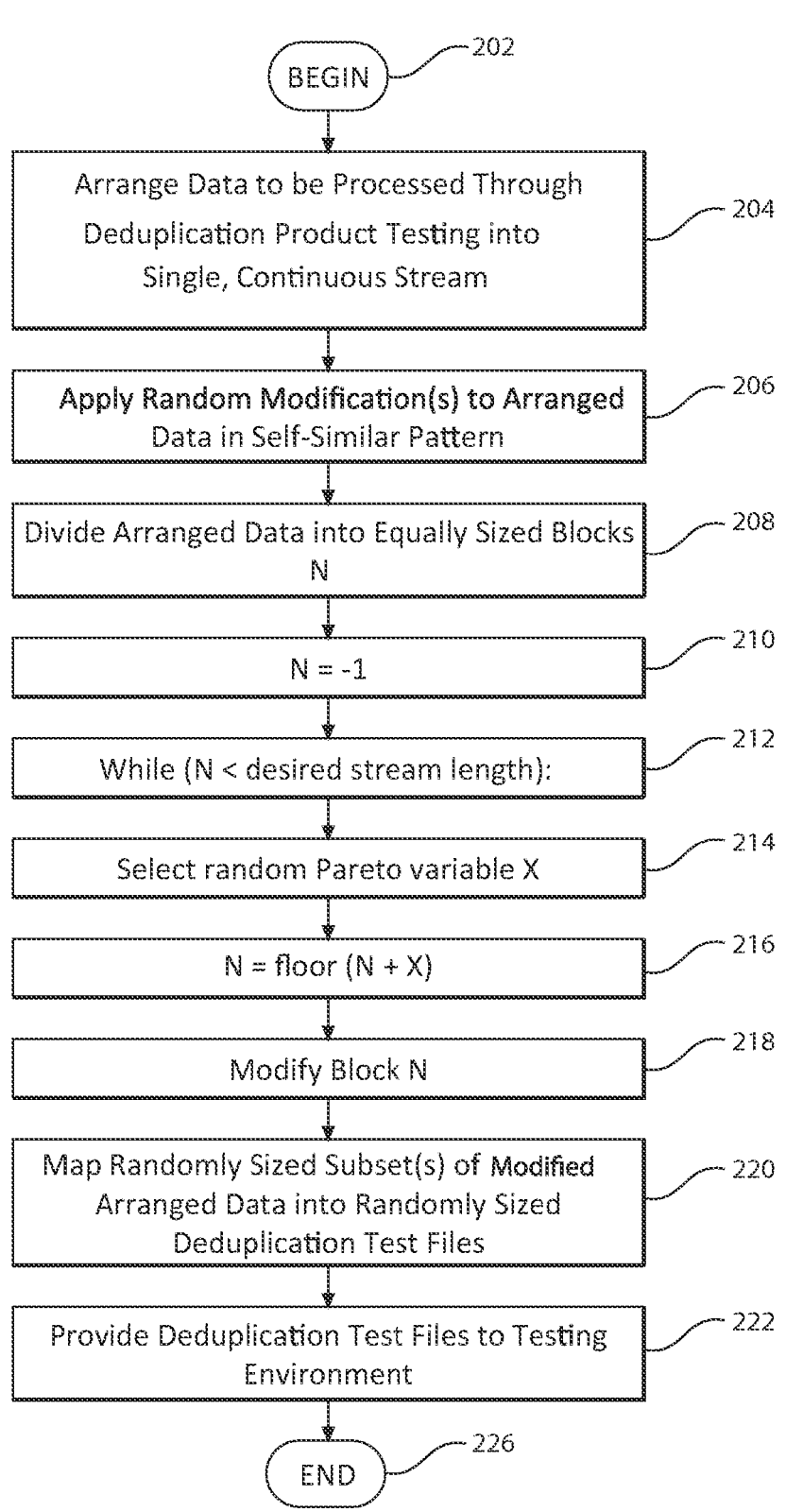
FIG. 4 is a flow chart diagram of an exemplary method for facilitating deduplication product testing in which aspects of the present invention may be implemented.

Turning to FIG. 4, an exemplary method 200 is depicted for facilitating deduplication product testing in a computing environment using the mechanisms of the present invention in a computing environment. As one skilled in the art will appreciate, various steps in the method 200 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 200 begins (step 202) with the arrangement of data to be processed through the deduplication product testing into a single, continuous stream (step 204) Random modifications are then applied to the arranged data in a self-similar pattern (step 206) as previously described. Application of the random modifications proceeds in steps 208-218. In step 208, the arranged data is divided into equally sized blocks N. As a next step, N=−1 (step 210), and while N is less than the desired stream length (step 212) a random Pareto variable X is selected (step 214), the value of N is added to the Pareto variable X as (N+X), and truncated to an integer (step 216), and the Block N is modified accordingly (step 218).

Following the application of random modifications, randomly sized subsets of the arranged and modified data are mapped into randomly sized deduplication test files (step 220). The deduplication files are then provided, either manually or through the application of the computing environment to a testing environment in the computing environment (step 222) for deduplication testing. The method then ends (step 226). While method 200 describes one exemplary methodology incorporating a particular technique for modifying the data in a self-similar pattern, the skilled artisan will appreciate that variations to the depicted methodology may be performed.

The methodology described above in FIG. 4 allows for the calibration of the generated random patterns of data against actual computing systems. As previously described, in one embodiment, a calibration may be performed whereby the arranged, modified data may be calibrated against I/O trace data of physical I/O references in a particular computing environment. As the skilled artisan will appreciate, additional calibrations may be performed to refine such parameters previously described as x_min and alpha in a particular implementation. The ease and flexibility of such of calibration using the above methodology and resultant modified data will be apparent to the skilled artisan.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for facilitating deduplication product testing in a computing environment by a processor in communication with a memory device, comprising:
    arranging data is processed through the deduplication product testing into a single, continuous stream;
    applying at least one of a plurality of random modifications to the arranged data in a self-similar pattern exhibiting scale invariance, including:
        dividing the arranged data into a plurality of equally sized blocks, and
        adding a randomly selected variable obeying a probability distribution to one of the plurality of equally sized blocks;
            wherein the dividing the arranged data and the adding the randomly selected variable are performed for each of the plurality of equally sized blocks while a number of the plurality of equally sized blocks is less than a desired stream length; and
    mapping a plurality of randomly sized subsets of the arranged data modified with the self-similar pattern into each of a plurality of randomly sized deduplication test files.

2. The method of claim 1, wherein the probability distribution includes a Pareto distribution.

3. The method of claim 1, further including providing the plurality of randomly sized deduplication test files to a testing environment in the computing environment, wherein the plurality of randomly sized deduplication test files are accessed by the testing environment.

4. The method of claim 1, further including calibrating the plurality of randomly sized deduplication test files against input/output (I/O) trace data obtained in the computing environment.

5. A method for facilitating deduplication product testing in a computing environment by a processor in communication with a memory device, comprising:
    a deduplication module associated with the processor and memory device in the computing environment, wherein the deduplication module is adapted for:
        arranging data is processed through the deduplication product testing into a single, continuous stream;
        applying at least one of a plurality of random modifications to the arranged data in a self-similar pattern exhibiting scale invariance, including:
            dividing the arranged data into a plurality of equally sized blocks, and
            adding a randomly selected variable obeying a probability distribution to one of the plurality of equally sized blocks;

wherein the dividing the arranged data and the adding the randomly selected variable are performed for each of the plurality of equally sized blocks while a number of the plurality of equally sized blocks is less than a desired stream length; and mapping a plurality of randomly sized subsets of the arranged data modified with the self-similar pattern into each of a plurality of randomly sized deduplication test files.

6. The method of claim 5, wherein the probability distribution includes a Pareto distribution.

7. The utility of claim 5, wherein the plurality of randomly sized deduplication test files are provided to a testing environment in the computing environment, wherein the plurality of randomly sized deduplication test files are accessed by the testing environment.

8. The utility of claim 5, wherein the deduplication module is further adapted for calibrating the plurality of randomly sized deduplication test files against input/output (I/O) trace data obtained in the computing environment.

9. The utility of claim 5, wherein the processor comprises a storage management processor responsible for management of a data storage environment associated with the computing environment.

10. The utility of claim 5, wherein the processor is adapted for performing a plurality of backup services including one of a full backup operation and an incremental backup operation.

11. A method for facilitating deduplication product testing in a computing environment by a processor in communication with a memory device, comprising:
 a first executable portion for arranging data is processed through the deduplication product testing into a single, continuous stream;
 a second executable portion for applying at least one of a plurality of random modifications to the arranged data in a self-similar pattern exhibiting scale invariance, including:
  dividing the arranged data into a plurality of equally sized blocks, and
  adding a randomly selected variable obeying a probability distribution to one of the plurality of equally sized blocks;
   wherein the dividing the arranged data and the adding the randomly selected variable are performed for each of the plurality of equally sized blocks while a number of the plurality of equally sized blocks is less than a desired stream length; and
 a third executable portion for arranging data to be processed through the deduplication product testing into a single, continuous stream mapping a plurality of randomly sized subsets of the arranged data modified with the self-similar pattern into each of a plurality of randomly sized deduplication test files.

12. The method of claim 11, wherein the probability distribution includes a Pareto distribution.

13. The computer program product of claim 11, further including a fourth executable portion for providing the plurality of randomly sized deduplication test files to a testing environment in the computing environment, wherein the plurality of randomly sized deduplication test files are accessed by the testing environment.

14. The computer program product of claim 11, further including a fourth executable portion for calibrating the plurality of randomly sized deduplication test files against input/output (I/O) trace data obtained in the computing environment.

15. A utility for facilitating deduplication product testing in a computing environment by a processor in communication with a memory device, comprising:
 a deduplication module associated with the processor and memory device in the computing environment, wherein the deduplication module is adapted for:
  arranging data is processed through the deduplication product testing into a single, continuous stream;
  applying at least one of a plurality of random modifications to the arranged data in a self-similar pattern exhibiting scale invariance, including:
   dividing the arranged data into a plurality of equally sized blocks, and
   adding a randomly selected variable obeying a probability distribution to one of the plurality of equally sized blocks;
    wherein the dividing the arranged data and the adding the randomly selected variable are performed for each of the plurality of equally sized blocks while a number of the plurality of equally sized blocks is less than a desired stream length; and
  mapping a plurality of randomly sized subsets of the arranged data modified with the self-similar pattern into each of a plurality of randomly sized deduplication test files.

16. The method of manufacture of claim 15, further including providing the plurality of randomly sized deduplication test files to a testing environment in the computing environment, wherein the plurality of randomly sized deduplication test files are accessed by the testing environment.

17. The method of manufacture of claim 15, wherein the deduplication module is further adapted for calibrating the plurality of randomly sized deduplication test files against input/output (I/O) trace data obtained in the computing environment.

* * * * *